US007672844B2

(12) United States Patent
Masuda et al.

(10) Patent No.: US 7,672,844 B2
(45) Date of Patent: Mar. 2, 2010

(54) VOICE PROCESSING APPARATUS

(75) Inventors: Akira Masuda, Kanagawa (JP); Yoshitaka Abe, Tokyo (JP); Hideharu Fujiyama, Chiba (JP)

(73) Assignee: Sony Corporation, Tokyo (JP)

( * ) Notice: Subject to any disclaimer, the term of this patent is extended or adjusted under 35 U.S.C. 154(b) by 1043 days.

(21) Appl. No.: 10/910,672

(22) Filed: Aug. 3, 2004

(65) Prior Publication Data

US 2005/0060148 A1 Mar. 17, 2005

(30) Foreign Application Priority Data

Aug. 4, 2003 (JP) ............................. 2003-286256

(51) Int. Cl.
*G10L 17/00* (2006.01)
*G10L 15/02* (2006.01)
*H04M 1/64* (2006.01)
*H04M 3/42* (2006.01)

(52) U.S. Cl. .................... 704/246; 704/250; 379/88.02; 379/202.01

(58) Field of Classification Search ......... 704/231–257, 704/270–275, E15.001, E15.05; 379/67.1–88.28, 379/202.01–207.02, 900; 381/71.1, 71.8, 381/92, 110–117
See application file for complete search history.

(56) References Cited

U.S. PATENT DOCUMENTS

| 4,837,804 | A | * | 6/1989 | Akita ........................ 379/88.02 |
| 5,897,616 | A | * | 4/1999 | Kanevsky et al. ............ 704/246 |
| 6,230,138 | B1 | * | 5/2001 | Everhart ..................... 704/275 |
| 6,434,520 | B1 | * | 8/2002 | Kanevsky et al. ............ 704/243 |
| 6,510,415 | B1 | * | 1/2003 | Talmor et al. ................ 704/273 |
| 6,542,600 | B1 | * | 4/2003 | Munson et al. .............. 379/242 |
| 6,542,866 | B1 | * | 4/2003 | Jiang et al. .................. 704/255 |
| 6,647,368 | B2 | * | 11/2003 | Nemirovski ................. 704/270 |
| 6,865,536 | B2 | * | 3/2005 | Jochumson .............. 704/270.1 |
| 7,054,811 | B2 | * | 5/2006 | Barzilay ..................... 704/246 |
| 7,120,278 | B2 | * | 10/2006 | Sukegawa et al. ........... 382/118 |
| 7,305,078 | B2 | * | 12/2007 | Kardos ................... 379/202.01 |
| 7,310,517 | B2 | * | 12/2007 | Wolff et al. ................. 455/416 |
| 2003/0125940 | A1 | * | 7/2003 | Basson et al. ............... 704/231 |

(Continued)

FOREIGN PATENT DOCUMENTS

EP 1 041 818 10/2000

(Continued)

*Primary Examiner*—David R Hudspeth
*Assistant Examiner*—David Kovacek
(74) *Attorney, Agent, or Firm*—Frommer Lawrence & Haug LLP; William S. Frommer; Ellen Marcie Emas

(57) ABSTRACT

A voice processing apparatus for performing voiceprint recognition processing with high accuracy even in the case where a plurality of conference participants speak at a time in a conference; wherein a bi-directional telephonic communication portion receives as an input respective voice signals from a plurality of microphones, selects one microphone based on the input voice signals, and outputs a voice signal from the microphone; a voiceprint recognition portion 322 performs voiceprint recognition based on the input voice signal in voiceprint recognizable period, and stores voiceprint data successively in a buffer; and a CPU takes out voiceprint data successively from the buffer, checking against voiceprint data stored in a voiceprint register, specifies a speaker, and processes the voice signal output from the bi-directional telephonic communication portion by associating the same with the speaker.

28 Claims, 11 Drawing Sheets

U.S. PATENT DOCUMENTS

| | | | |
|---|---|---|---|
| 2004/0013252 A1* | 1/2004 | Craner | 379/142.01 |
| 2004/0091086 A1* | 5/2004 | Ortel | 379/88.02 |
| 2004/0170261 A1* | 9/2004 | Baker | 379/114.01 |
| 2004/0172252 A1* | 9/2004 | Aoki et al. | 704/270 |
| 2004/0186724 A1* | 9/2004 | Morin | 704/273 |
| 2005/0135583 A1* | 6/2005 | Kardos | 379/142.01 |
| 2005/0182631 A1* | 8/2005 | Lee et al. | 704/275 |

FOREIGN PATENT DOCUMENTS

| | | |
|---|---|---|
| JP | 1-15880 | 6/1989 |
| JP | 4-122184 | 4/1992 |
| JP | 10-276417 | 10/1998 |
| JP | 2000-29486 | 1/2000 |
| JP | 2000-80828 | 3/2000 |
| JP | 2001-51694 | 2/2001 |
| JP | 2001-204092 | 7/2001 |
| JP | 2003-122394 | 4/2003 |
| JP | 2004-309965 | 11/2004 |
| JP | 2005-55666 | 3/2005 |
| JP | 2005-55667 | 3/2005 |

* cited by examiner

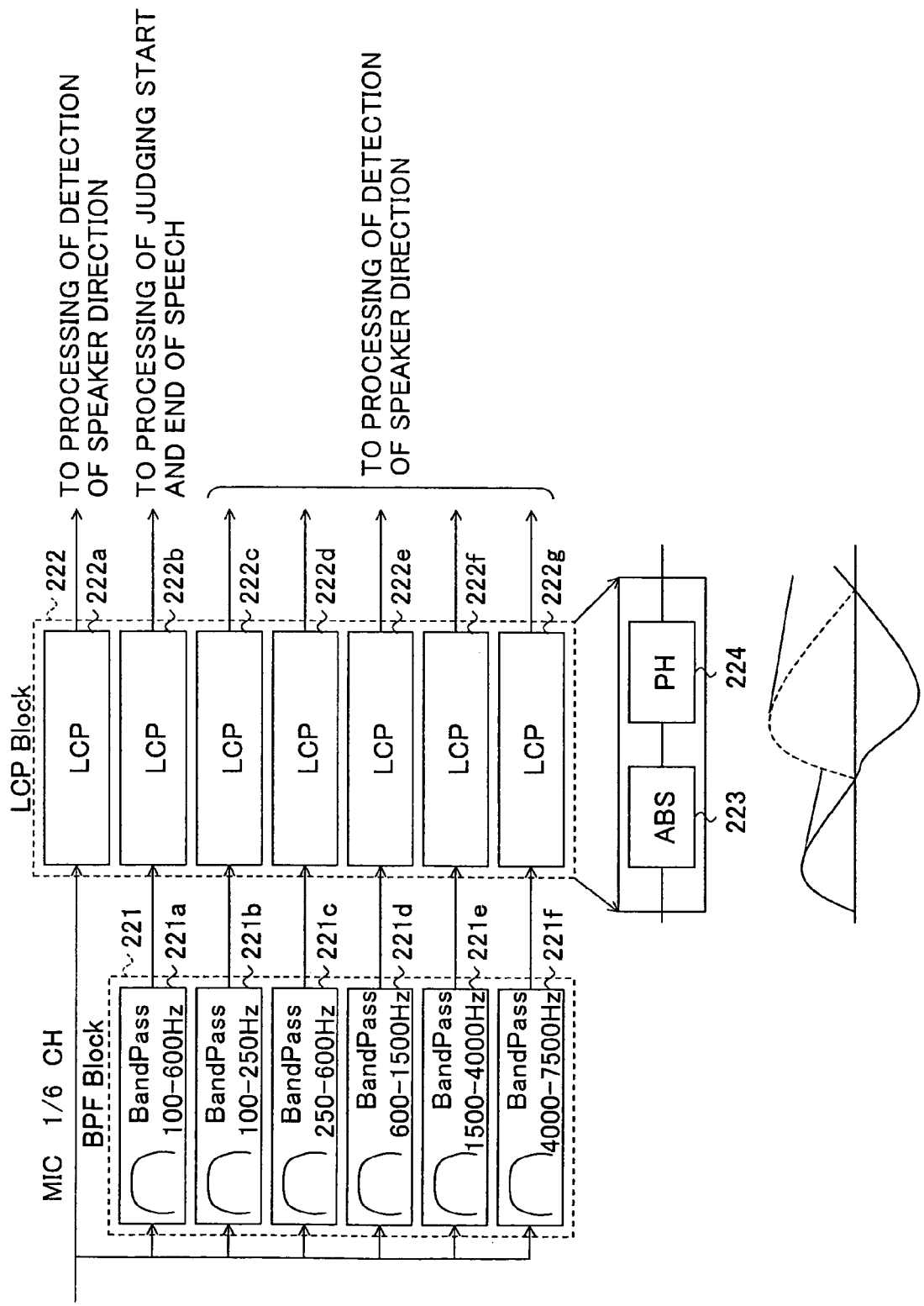

WHEN SOUND SOURCE EXISTS IN FRONT OF MICROPHONE

WHEN SOUND SOURCE EXISTS IN THE DIRECTION OF 60 DEGREES FROM THE FRONT OF MICROPHONE

WHEN SOUND SOURCE EXISTS IN THE DIRECTION OF 120 DEGREES FROM THE FRONT OF MICROPHONE

WHEN SOUND SOURCE EXISTS IN THE DIRECTION OF 180 DEGREES FROM THE FRONT OF MICROPHONE

VOICE PROCESSING APPARATUS

BACKGROUND OF THE INVENTION

1. Field of the Invention

The present invention relates to a voice processing apparatus for recognizing a command by voice uttered, for example, by a plurality of conference participants and processing the same.

2. Description of the Related Art

A voice processing apparatus having a function of performing voiceprint recognition on human voice and processing the same (voiceprint recognition) has been based on a premise of a microphone connected to a control apparatus, such as a telephone and a personal computer (PC), as an input means of the voice, and a voice processing apparatus provided with such a microphone has been applied for personal identification, etc., for example, in a call center and a network in a financial institution.

However, such a voice processing apparatus of the related art is intended to individual voice recognition as its use environment. Therefore, when using such a voice processing apparatus in a scene of a group work with a plurality of people, for example, in a conference with a plurality of people, a plurality of voices will be erroneously detected and erroneously recognized, so it has not been usable.

Namely, in a state where two or more participants speak at a time, since a plurality of voices are mixed and input to the voice processing apparatus through a microphone, it is impossible to specify a conference participant as a main speaker among a plurality of speakers and to obtain an accurate voiceprint recognition result.

On the other hand, conventionally, conference content is recorded in a recording medium by a recording apparatus, etc. in a conference or other group works, and minutes are written after the conference by confirming each speaker. Although there has been a method of recording the conference content as they are in a recording medium, organizing data of each speaker takes some time and the work is demanding.

Thus, a method of performing personal identification by the above voiceprint recognition technique and arranging speech data for each speaker can be considered. However, in the case where speeches of a plurality of participants overlap in a conference, etc., it is difficult to specify who is speaking, and so personal identification of the speakers is impossible by applying the above voiceprint recognition technique as it is.

Furthermore, there is a disadvantage that attribute data (name and role, etc.) for a speaker cannot be output by real-time processing while the speaker is speaking in a conference. Therefore, participants have to refer to distributed documents, etc. and cannot concentrate on the speech.

Also, a chairperson of a conference has to operate a PC to show data and add an explanation by speaking, which are very demanding and unfavorable in terms of an efficiency of the conference.

Thus, there has been a demand for accurately specifying a main speaker and outputting attribute data of the speaker on a screen or with a voice at a time to notify all conference participants even when a plurality of participants speak at a time.

SUMMARY OF THE INVENTION

An object of the present invention is to provide a voice processing apparatus for specifying a conference participant as a main speaker among a plurality of speakers and accurately performing personal identification by voiceprint recognition, for example, when processing by recognizing voiceprint of voices uttered by a plurality of conference participants.

To attain the above object, there is provided a voice processing apparatus, comprising a plurality of microphones arranged to direct to respectively different sound collecting directions; a microphone selection means for selecting one microphone in accordance with sound pressures of sounds collected by said plurality of microphones; a voiceprint recognition means for successively performing voiceprint recognition in voiceprint recognizable time based on a voice signal collected by said one microphone and generating voiceprint data; and a data processing means for processing the voice signal collected by said one microphone in accordance with the voiceprint data generated by said voiceprint recognition means.

Preferably, a voiceprint data memory means is further provided for storing speaker data and voiceprint data by associating the both, wherein said data processing means performs processing the voiceprint data generated by the voiceprint recognition means by associating with speaker data obtained by checking against voiceprint data stored in said voiceprint data memory means.

Preferably, a voice conversion means is furthermore provided for converting a voice signal to character string data, wherein said voice conversion means converts the voice signal collected by said one microphone to character string data; and said data processing means processes said character string data by associating with the speaker data obtained by checking against said voice signal.

To attain the above object, according to a second aspect of the present invention, there is provided a voice processing apparatus, comprising a plurality of microphones arranged to direct to respectively different sound collecting directions; a microphone selection means for selecting one microphone in accordance with sound pressures of sounds collected by said plurality of microphones; a voiceprint recognition means for successively performing voiceprint recognition in voiceprint recognizable time based on a voice signal collected by said one microphone and generating voiceprint data; a voiceprint data memory means for storing speaker data and voiceprint data by associating the both; an attribute data memory means for storing speaker data and attribute data by associating the both; and a data processing means for specifying speaker data by matching voiceprint data generated by the voiceprint recognition means with voiceprint data stored in said voiceprint data memory means, and processing the same by associating said speaker data with corresponding attribute data.

Operations of a voice processing apparatus according to the first aspect of the present invention are as below.

Namely, the microphone selection means selects one microphone in accordance with sound pressures collected by the plurality of microphones. The voiceprint recognition means successively performs voiceprint recognition in voiceprint recognizable time based on a voice signal collected by the one microphone and generates voiceprint data. The data processing means processes the voice signal collected by the one microphone in accordance with the voiceprint data generated by the voiceprint recognition means.

Operations of a voice processing apparatus according to the second aspect of the present invention are as below.

Namely, the microphone selection means selects one microphone in accordance with sound pressures collected by the plurality of microphones. The voiceprint recognition means successively performs voiceprint recognition in voiceprint recognizable time based on a voice signal collected by the one microphone and generates voiceprint data.

The data processing means checks voiceprint data generated by the voiceprint recognition means against voiceprint data stored in the voiceprint data memory means and specifies speaker data. Furthermore, it processes the specified speaker data by associating with attribute data obtained by checking against the attribute data memory means and subjected to processing.

According to the present invention, there are advantages that even in the case where speeches overlap, for example, in a conference, etc., a main speaker is specified with high accuracy, attribute data, etc. of the speaker can be shown to conference participants at a time on a screen, etc., and therefore the conference can proceed smoothly.

BRIEF DESCRIPTION OF DRAWINGS

These and other objects and features of the present invention will become clearer from the following description of the preferred embodiments given with reference to the attached drawings, in which:

FIG. 2 is a block diagram of a DSP 22 of the bi-directional telephonic communication portion 2;

DESCRIPTION OF THE PREFERRED EMBODIMENT

In later explained first to third embodiments, a bi-directional telephonic communication portion 2 explained below is used in any one of them, so the configuration and operation of the bi-directional telephonic communication portion 2 will be explained first with reference to FIG. 1 to FIG. 4 for convenience of explanations, then, the explanations of the respective embodiments will follow.

Bi-Directional Telephonic Communication Portion 2

Figure 1:
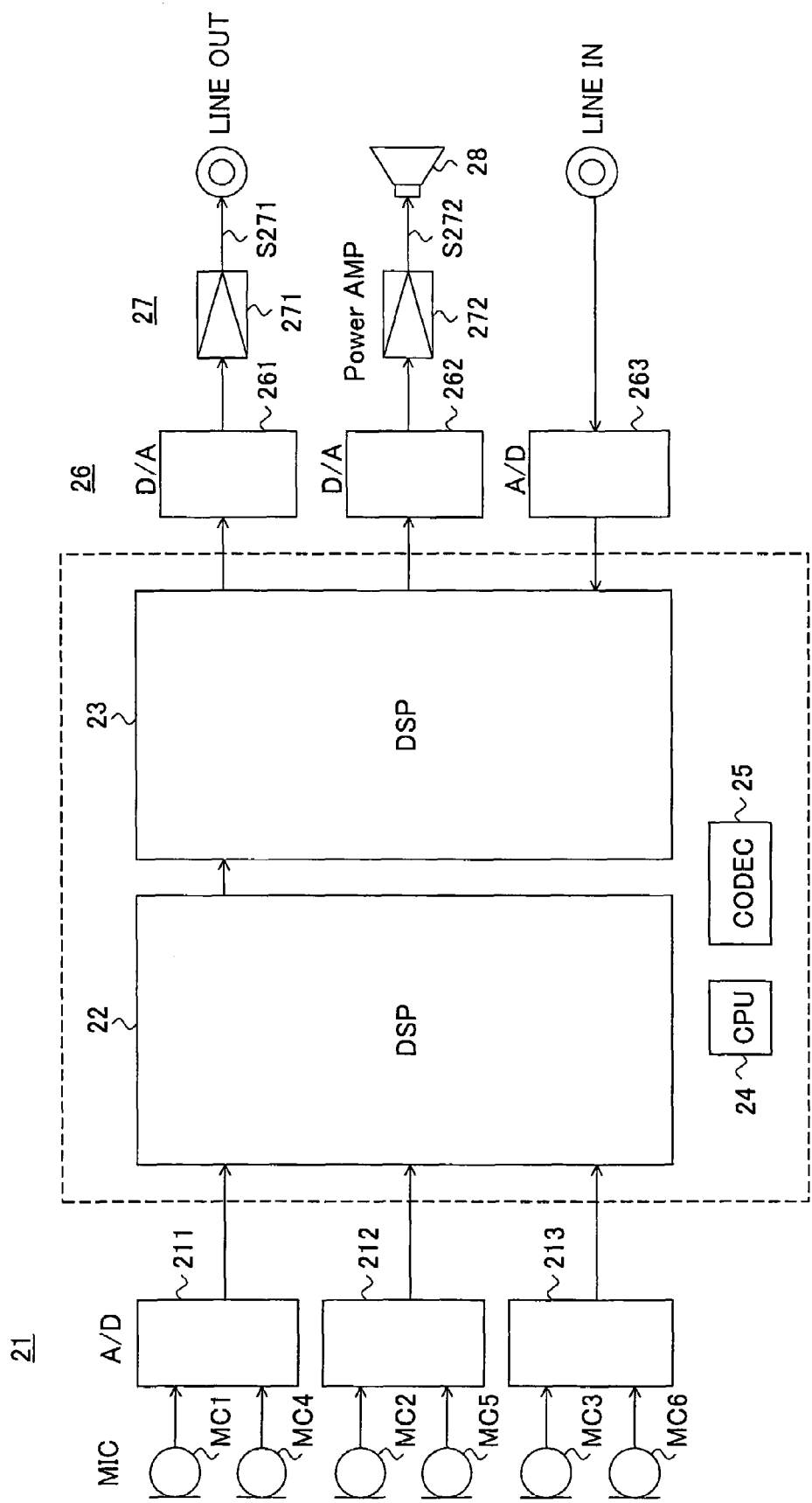
FIG. 1 is a block diagram of a bi-directional telephonic communication portion 2.
Figure 3A:
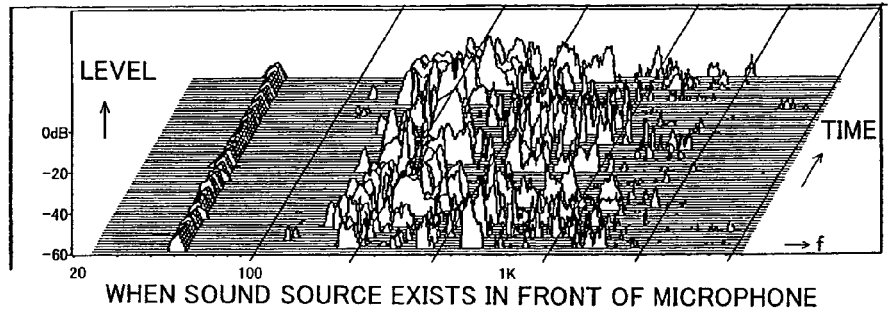
FIG. 3A to FIG. 3D are views of FFT results of a directional microphone of the bi-directional telephonic communication portion 2.
Figure 3B:
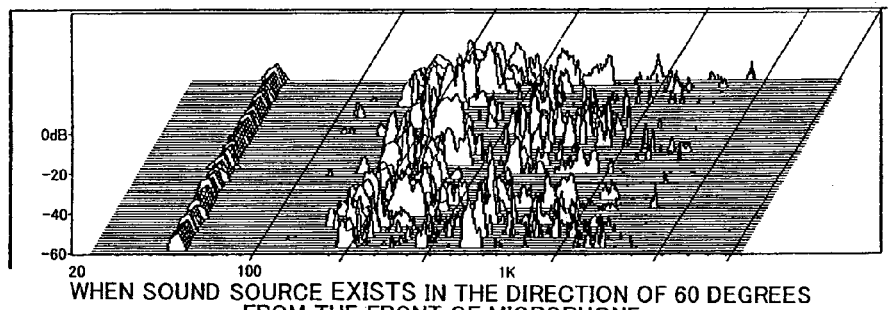
Figure 3C:
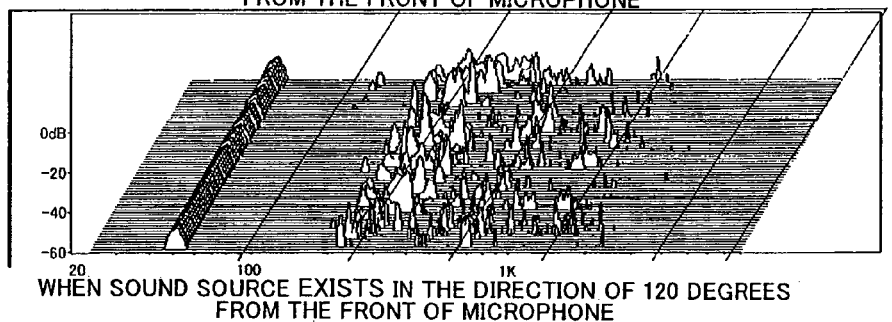
Figure 3D:
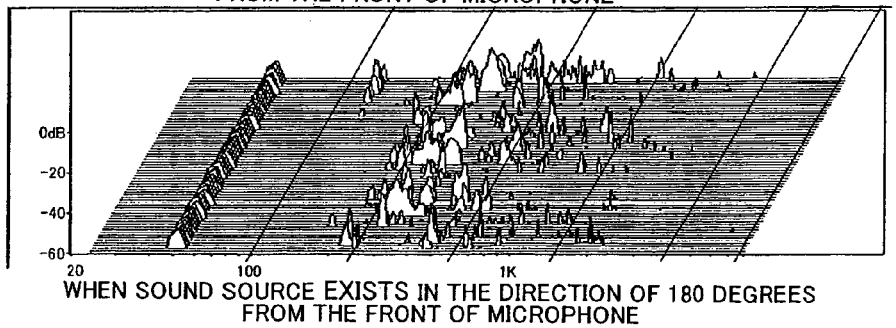

FIG. 1 is a circuit block diagram of a bi-directional telephonic communication portion 2.

As shown in FIG. 1, the bi-directional telephonic communication portion 2 comprises an A/D converter block 21, digital signal processors (DSP) 22 and 23, a central processing unit (CPU) 24, a codec 25, a D/A converter block 26 (D/A converters 261 and 262), an A/D converter 263, and an amplifier block 27.

The bi-directional telephonic communication portion 2 receives as an input voice from six unidirectional microphones MC1 to MC6 in the example in FIG. 1. A unidirectional microphone shows strong directivity to the front of a position the microphone is arranged.

The CPU 24 performs control processing of the overall bi-directional telephonic communication portion 2.

The codec 25 encodes voices.

The DSP 22 performs a variety of signal processing, such as filter processing and microphone selection processing, which will be explained in detail later on.

The DSP 23 functions as an echo canceller.

In FIG. 1, A/D converters 211 to 213 are shown as an example of the A/D converter block 21, a A/D converter 263 is shown as an example of the A/D converter, D/A converters 261 and 262 are shown as an example of the D/A converter block 26, and amplifiers 271 and 272 are shown as an example of the amplifier block 27.

Respective pairs of the microphones MC1 and MC4, MC2 and MC5, and MC3 and MC6 are input to the A/D converters 211 to 213 for converting two-channel analog signals to digital signals.

Sound collection signals of the microphones MC1 to MC6 converted in the A/D converters 211 to 213 are input to the DSP 22 and subjected to a variety of later explained signal processing.

As one processing result of the DSP 22, one of the microphones MC1 to MC6 is selected. In the DSP 22, selection of a microphone is performed by using the above unidirectional characteristic of the microphones.

A processing result of the DSP 22 is output to the DSP 23 and subjected to echo chancel processing.

A processing result of the DSP 23 is converted to an analog signal by the D/A converters 261 and 262. An output from the D/A converter 261 is encoded by the codec 25 in accordance with need and output via the amplifier 271.

Also, an output from the D/A converter 262 is output as a sound from a speaker 28 of the bi-directional telephonic communication portion 2 via the amplifier 272. Namely, conference participants using the bi-directional telephonic communication portion 2 can listen to a voice uttered by a speaker in the conference room through the speaker 28.

The bi-directional telephonic communication portion 2 inputs a voice of the other party to the DSP 23 via the A/D converter 263 and performs echo chancel processing. Also, a voice of the other party is applied to the speaker 28 by a not shown path and output as a sound.

Note that when using a microphone having no directivity, all sounds around the microphone are collected, so the S/N (Signal to Noise) of a voice of the speaker and noises around is not good. To prevent this, in the present embodiment, the S/N with the noises around is improved by collecting sounds with directional microphones.

Next, processing performed by the DSP 22 will be explained.

Main processing performed by the DSP 22 is processing of selecting and switching microphones. Namely, when a plurality of conference participants using the bi-directional telephonic communication portion 2 speak at a time, their voices are mixed and hard to be heard by the other party, so only a voice signal from a selected microphone is output as a signal S271 in FIG. 1.

A variety of signal processing explained below as examples are performed for accurately performing the present processing.

(a) Processing of band separation and level conversion of microphone signals (b) Processing of judging start and end of a speech (c) Processing of detection of a microphone in a speaker direction Analyzing sound collection signals of each microphone and judging a microphone facing to a speaker (d) Switching timing judging processing of a microphone in the direction of the speaker, and selection/switching processing of a microphone signal facing to the detected speaker Below, the above respective signal processing will be explained.

(a) Processing of band separation and level conversion of microphone signals

Processing of judging start and end of a speech is performed on one of triggers of starting the microphone selection processing. For that purpose, band-pass filter (hereinafter, referred to as BPF) processing and level conversion processing are performed on each microphone signal.

FIG. 2 is a view showing only one channel (CH) among six microphones MC1 to MC6 in the BPF processing and level conversion processing.

A BPF processing and level conversion processing circuit comprises BPF 221a to 221f (collectively referred to as a BPF block 221) each having a band-pass characteristic of 100 to 600 Hz, 100 to 250 Hz, 250 to 600 Hz, 600 to 1500 Hz, 1500 to 4000 Hz and 4000 to 7500 Hz and level converters 222a to 222g (collectively referred to as a level conversion block 222) for performing level conversion on original microphone sound collection signals and the above band-pass sound collection signals.

Each level converter comprises a signal absolute value processing portion 223 and a peak hold processing portion 224. Accordingly, as shown in a waveform chart as an example, the signal absolute value processing portion 223 inverts a code of an input negative signal indicated by a dotted line and converts the same to a positive signal. Then, the peak hold processing portion 224 holds the absolute value of the output signal of the signal absolute value processing portion 223.

(b) Processing of judging start and end of a speech

The DSP 22 judges a start of a speech when sound pressure level data subjected to sound pressure level conversion in the microphone signal level conversion processing portion 222b shown in FIG. 2, passing the BPF of 100 to 600 Hz, becomes a predetermined value or more, and judges an end of the speech when the data becomes a predetermined value or less for a certain time (for example, 0.5 second).

(c) Processing of detection of a microphone in a speaker direction

A characteristic of a unidirectional microphone shown in an example in FIG. 3 is used for detection of a speaker direction.

In a unidirectional microphone, a frequency characteristic and level characteristic change in accordance with an angle that a voice reaches from the speaker to the microphone as shown in FIG. 3. In FIG. 3, a speaker is placed by leaving a distance of 1.5 meter from the bi-directional telephonic communication portion 2, and a result of performing FFT at constant time intervals on sounds collected by the respective microphones is shown. The X-axis indicates a frequency, the Y-axis indicates time, and the Z-axis indicates a signal level. Lines drawn for every specific frequency on the XY plane indicate cutoff frequencies of the BPF processing explained with reference to FIG. 2, and a level of a frequency band between the lines passes through the BPF 221b to 221f in FIG. 2 to become data for the processing.

Output levels of the BPF of the respective bands are subjected to respectively suitable weighting processing (for example, when assuming a 1 dBFs step, a weighted value will be "0" for 0 dBFs, and "3" for −3 dBFs). Resolution of processing is determined by this weighting step.

The above weighting processing is performed by every one sample clock, weighted values of the respective microphones are added, an average is taken for a certain number of samples, and a microphone having the smallest (or largest) total value is judged to be a microphone facing to a speaker. The result is visualized in Table 1.

In an example in Table 1, the MIC1 has the smallest total value, so it is judged that a sound source exists in the direction of the microphone 1. The result is held in a form of a microphone number in the direction of the sound source.

TABLE 1

|      | BPF1 | BPF2 | BPF3 | BPF4 | BPF5 | TOTAL |
|------|------|------|------|------|------|-------|
| MIC1 | 20   | 20   | 20   | 20   | 20   | 100   |
| MIC2 | 25   | 25   | 25   | 25   | 25   | 125   |
| MIC3 | 30   | 30   | 30   | 30   | 30   | 150   |
| MIC4 | 40   | 40   | 40   | 40   | 40   | 200   |
| MIC5 | 30   | 30   | 30   | 30   | 30   | 150   |
| MIC6 | 25   | 25   | 25   | 25   | 25   | 125   |

(d) Switching timing judging processing of a microphone in the direction of a speaker, and selection/switching processing of a microphone signal facing to the detected speaker When a speech of a certain speaker (for example, the microphone MC1) ends and a speech from other direction (for example, the microphone MC2) newly arises, as explained in (b) processing of judging start and end of the speech, after a certain time (for example, 0.5 second) from a time when a microphone (MC1) signal level of the previous speaker becomes a predetermined value or less, it is judged that the speech of the speaker has ended.

When a microphone (MC2) signal level becomes a predetermined value or more because a speech of the subsequent speaker starts, the microphone facing to the subsequent speaker is determined as a sound collection microphone and microphone signal selection/switching processing starts.

When a speech with larger voice (the subsequent speaker (microphone MC2)) from other direction newly arises while the speech of the previous speaker (microphone MC1) is speaking, the processing of judging and switching of a microphone starts after a certain time (for example, 0.5 second) from a start of the subsequent speaker's speech (when the signal level of the microphone MC2 becomes a predetermine value or more).

Processing of judging and switching of a microphone is performed as below.

Namely, when there is a speaker (microphone MC2) making a speech with larger voice than the currently selected speaker before finishing the speech of the first speaker (microphone MC1), the sound pressure level from the microphone MC2 becomes high. Consequently, in (c) processing of detection of a microphone in a speaker direction, values of the MC1 and the MC2 in above Table 1 are reversed, and as soon as the microphone number in the direction of a sound source is changed from the microphone MC1 to MC2, and microphone signal selecting/switching processing is performed.

Figure 4:
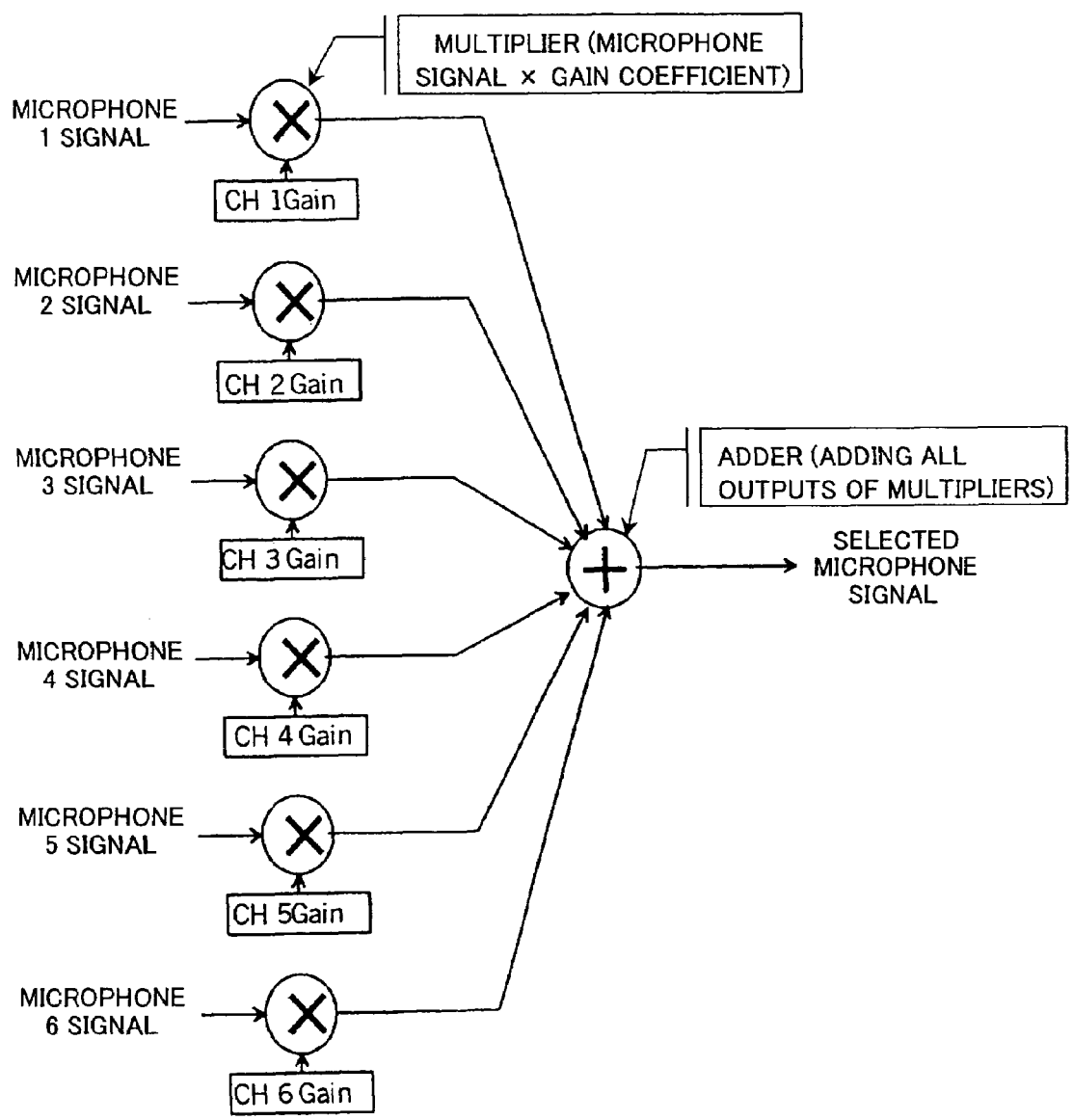
FIG. 4 is a view of an output of a selection microphone signal of the bi-directional telephonic communication portion 2.

The microphone signal selecting/switching processing is configured by six multiplier circuits and an adder with six inputs as shown in FIG. 4. To select a microphone signal, by setting a channel gain (CH gain) of a multiplier connected to a microphone signal to be selected to "1" and setting channel gains of other multipliers to "0", processing results of [selected microphone signal×1] and [other microphone signals×0] are added in the adder, and a desired microphone selection signal is output.

Note that changes of the channel gains before and after switching microphones (for example, CH1 gain and CH2 gain) are made gradually, for example, in 10 ms.

As explained in detail above, according to the bi-directional telephonic communication portion 2, it is possible by using characteristics of a directional microphone to collect sounds from a speaker with preferable S/N and to suitably select one microphone signal among a plurality of microphone signals, and the selected microphone signal and selected microphone information (a microphone number of 1 to 6) are supplied to an apparatus on the latter stage.

First Embodiment

Below, a voice processing apparatus in a first embodiment will be explained.

Figure 5:
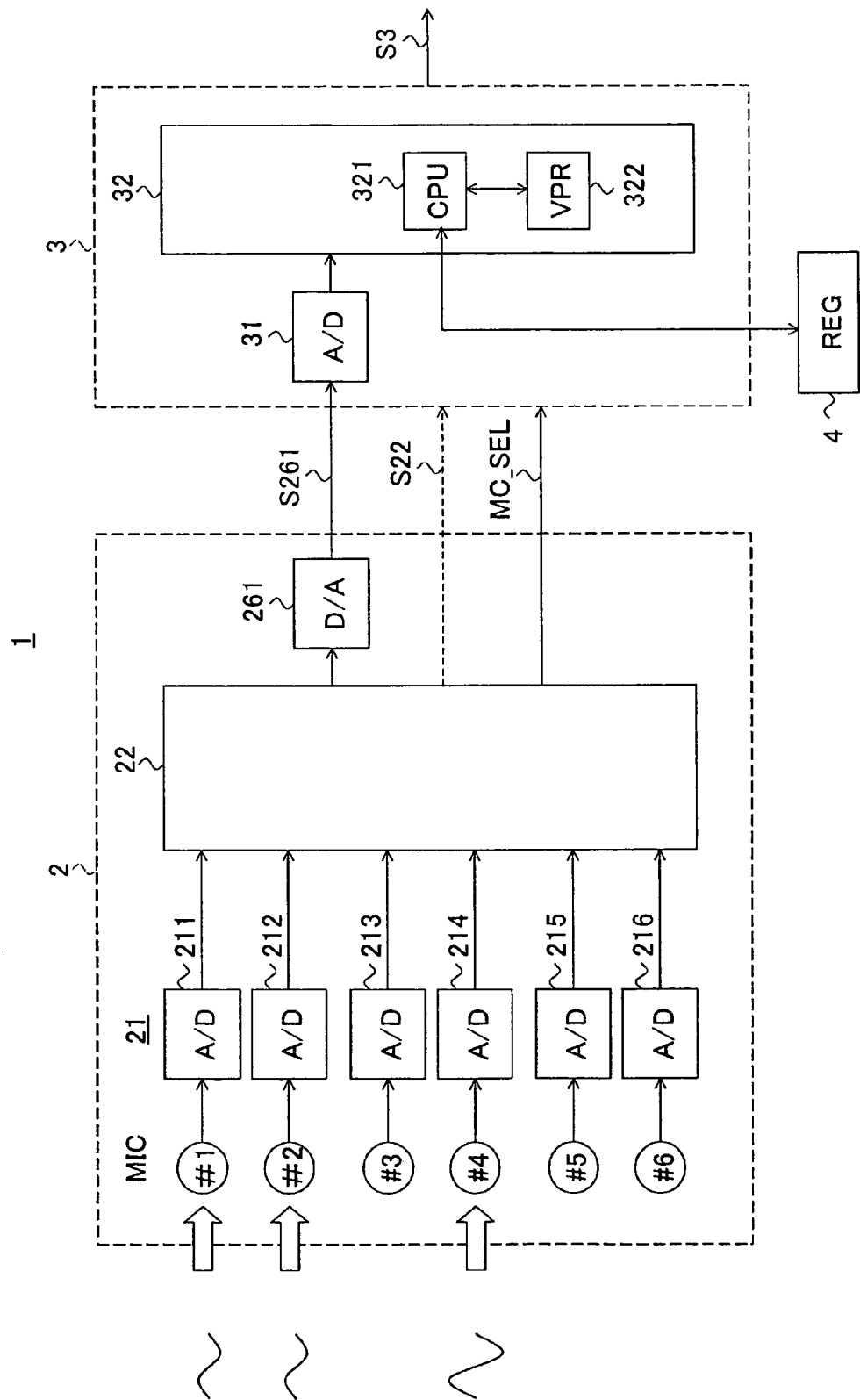
FIG. 5 is a block diagram of a voice processing apparatus 1 of a first embodiment.

FIG. 5 is a block diagram of a voice processing apparatus 1 in the first embodiment.

As shown in FIG. 5, the voice processing apparatus 1 comprises the above explained bi-directional telephonic communication portion 2, a voice recognition processing portion 3 and a voiceprint register 4.

The voice recognition processing portion 3 has an A/D converter 31 and a recognition processing portion 32, and the recognition processing portion 32 has a CPU 321 and a voiceprint recognition portion 322.

Note that a microphone selection means in the present invention corresponds to the bi-directional telephonic communication portion 2 in the first embodiment.

A voiceprint recognition means in the present invention corresponds to the voiceprint recognition portion 322 in the first embodiment.

A data processing means in the present invention corresponds to the CPU 321 in the first embodiment.

The voice processing apparatus 1 according to the first embodiment is used, for example, by being set at the center of a round table of a conference room.

The bi-directional telephonic communication portion 2 is provided with a plurality of, for example 6, microphones facing to respective conference participants, receives voices of the conference participants, selects one microphone signal to output to the voice recognition processing portion 3 and notifies the selected microphone number.

The voice recognition processing portion 3 performs processing on signals of a microphone selected in the bi-directional telephonic communication portion 2, specifies a speaker and outputs a speaker code.

The voiceprint register 4 stores speakers codes for identifying speakers and voiceprint data of speakers by associating the both, which are referred to by the CPU 321 for voiceprint matching.

Note that in the bi-directional telephonic communication portion 2 of the voice processing apparatus 1 shown in FIG. 5, the A/D converter block 21 is composed not of two-channel A/D converter explained with reference to FIG. 1, but of one-channel A/D converters 211 to 216 respectively for the microphones. The bi-directional telephonic communication portion 2 of the voice processing apparatus 1 shown in FIG. 5 does not use a speaker 28, so a portion around it and a DSP 23 for performing echo cancel processing are not necessary and omitted in FIG. 5.

Also, in the voice processing apparatus 1 shown in FIG. 5, in the case where the bi-directional telephonic communication portion 2 and the voice recognition processing portion 3 are integrally formed, etc., a microphone signal S261 selected by the bi-directional telephonic communication portion 2 does not have to be supplied as an analog signal to the voice recognition processing portion 3, so that it is supplied as a digital signal S22 indicated by a dotted line to the voice recognition processing portion 3. However, it is assumed to be supplied as an analog signal (signal S261) in an explanation below.

As explained above, selected microphone information (a microphone number of 1 to 6) is supplied as MC_SEL to the voice recognition processing portion 3.

The voice recognition processing portion 3 is composed of an A/D converter 31 and a voice recognition processing portion 32, and the voice recognition processing portion 32 has a CPU 321 and a voiceprint recognition portion 322.

The A/D converter 31 receives as an input a microphone signal (S261) as an analog signal selected by the bi-directional telephonic communication portion 2 and converts the same to a digital signal.

The voice recognition processing portion 32 receives as an input a digitized microphone signal from the A/D converter 31 and retrieves a microphone signal selected by the bi-directional telephonic communication portion 2.

Accordingly, the voice recognition processing portion 32 is supplied with a microphone signal which is sequentially updated in accordance with switching of a microphone by the bi-directional telephonic communication portion 2 and microphone information (microphone number of 1 to 6) MC_SEL thereof.

The CPU 321 controls the whole voice recognition processing portion 32 and specifies a speaker particularly by checking later explained voiceprint data.

The voiceprint recognition portion 322 performs voiceprint processing by a voiceprint recognizable period unit on the microphone signal subjected to digital conversion by the A/D converter 31 to generate voiceprint data based on an instruction from the CPU 321.

Here, the voiceprint recognizable period may be set by a variety of aspects.

For example, it may be a predetermined short period of 3 seconds, or a minimum period may be set in accordance with a voiceprint recognition capability of the voiceprint recognition portion 322. Alternately, it may be set to be a shorter period than one phrase.

Accordingly, a voiceprint recognizable period may be flexibly set in accordance with the voiceprint recognition capability of the voiceprint recognition portion 322 as a voiceprint recognition engine applied to the voice processing apparatus 1 and applications and conditions where the voice processing apparatus 1 is used. A minimum period can be set as far as the applications and conditions permit.

In the present embodiment, the voiceprint recognizable period unit is set to be 3 seconds.

Next, an operation of the voice recognition processing portion 32 will be explained with reference to FIG. 6A to FIG. 6G.

FIG. 6A to FIG. 6G are views of processing operations of the voice processing apparatus 1 when a person A, a person B and a person C make a speech successively.

First, in FIG. 6A, an upward arrow indicates a start of voiceprint recognition and a downward arrow indicates an end of the voiceprint recognition. Here, it takes three seconds from a start to an end of voiceprint recognition, and the voiceprint recognition portion 322 performs voiceprint recognition processing in unit of three seconds to generate voiceprint data.

In FIG. 6B, speech data of the person A is retrieved by the voiceprint recognition portion 322 via the bi-directional telephonic communication portion 2 and the A/D converter 31.

In the voiceprint recognition portion 322, the voiceprint data is generated based on the speech data of the person A for every three seconds as a unit of voiceprint recognition, and stores in a not shown buffer in the recognition processing portion 32.

FIG. 6C is a view showing that the speech data is subjected to voiceprint processing and voiceprint data is stored in the buffer.

In FIG. 6C, a length of data just before the end of the speech in the speech data of the person A is less than three seconds which is necessary for voiceprint processing, so voiceprint processing cannot be performed.

FIG. 6D is a view showing that voiceprint data stored in the buffer is sequentially subjected to processing by the CPU 321.

In the CPU 321, voiceprint data stored in the buffer is sequentially checked against voiceprint data stored in the voiceprint register 4 in advance. Since voiceprint data corresponding to speaker data is stored in the voiceprint register 4, the CPU 321 understands that the speaker is a person A based on the speaker data as a result of the check.

In the personal identification processing, based on the microphone switching signal MC_SEL supplied from the bi-directional telephonic communication portion 2, recognition accuracy can be furthermore improved.

Namely, when data wherein the microphone numbers and the speaker data are associated is stored in the recognition processing portion 32 in advance, the speaker can be specified by checking data (1 to 6) of the microphone switching signal MC_SEL against the speaker data made to be corresponding to the microphone number.

For example, it may be configured to compare speaker data specified based on the microphone switching signal MC_SEL with speaker data specified by voiceprint matching explained above and perform processing on a microphone signal only when the two are matched.

Also, it may be configured that when speaker data specified based on the microphone switching signal MC_SEL and speaker data specified by voiceprint matching explained above are not matched, a result of voiceprint matching is judged to be more accurate and processing is performed on the microphone signal based on the speaker data specified by the voiceprint matching.

In FIG. 6D, a time lag does not occur comparing with the case in FIG. 6C, but since personal identification is performed after a time for processing performed in the CPU 321 as explained above, there is a time shift to the right direction by an amount of the processing time.

FIG. 6E is a view of data of a speech by the person A finished with personal identification.

As explained above, speech data (a microphone signal) finished with personal identification can be sequentially output as a signal S3 in FIG. 5 and accumulated for each speaker data in a not shown hard disk drive (HDD) or other external memory.

Here, since a length of data just before the end of the speech is less than 3 seconds in the speech data of the person A, identification processing cannot be performed on the data but it may be added and output as speech data of the person A.

Alternately, as an output of the signal S3 in FIG. 5, only speech data (data indicating the person A in this case) specified by the CPU 321 may be output.

After that, also when a selected microphone shifts from #4 to #2 in the bi-directional telephonic communication portion 2 and a speech by a person B starts, the operation is the same as processing on the speech data of the person A explained above.

Figure 6:
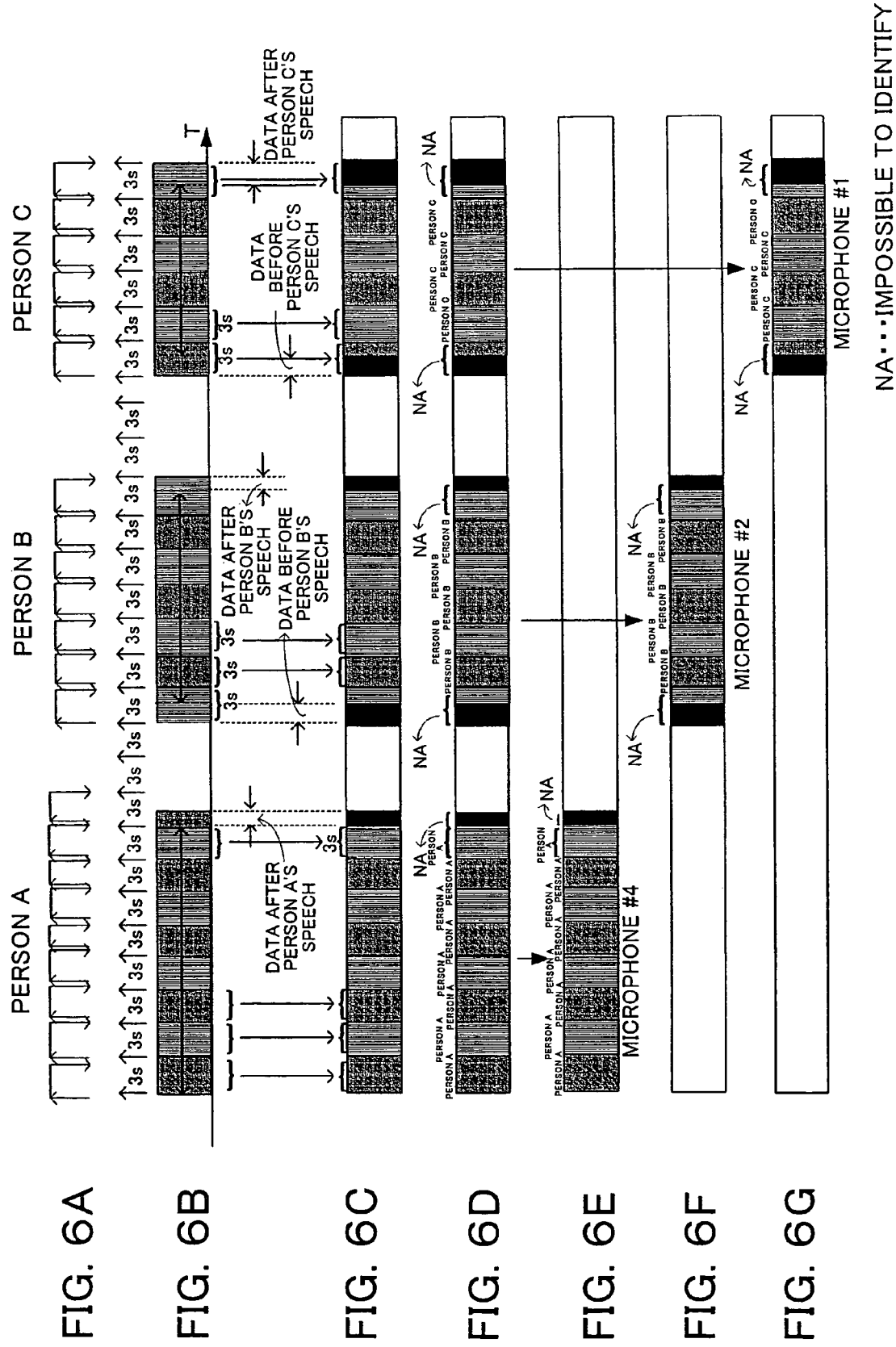
FIG. 6A to FIG. 6G are views for explaining an operation of the voice processing apparatus 1 in the first embodiment.

In the speech by the person B shown in FIG. 6, since time length of sampled data is less than 3 seconds, which is a period unit of voiceprint identification processing, not only at the end of the speech but also at the start of the speech, there are portions on which personal identification cannot be performed. In this case also, processing is performed to add to an output as the speech of the person B.

After that, also when the selected microphone shifts from #2 to #1 in the bi-directional telephonic communication portion 2 and a speech by a person C starts, the operation is the same as the operation of processing on the speech data of the person A explained above.

The first embodiment of the voice processing apparatus according to the present invention was explained above.

According to the voice processing apparatus 1 in the first embodiment, even in the case where speechs by a plurality of persons to the voice processing apparatus 1 overlap through microphones respectively facing to a plurality of conference participants, a sound pressure level is analyzed for each band of respective voices by characteristics of the bi-directional telephonic communication portion 2 provided to the voice processing apparatus 1, a microphone signal of a main speaker is specified, and the voice signal is given to the voice recognition processing portion 3.

Accordingly, in the voice recognition processing portion 3, a possibility of causing erroneous recognition processing can be prevented as much as possible even when a plurality of voices are input at a time, and it is possible to suitably judges a voice of a main speaker and perform processing.

The voice recognition processing portion 3 performs voice recognition processing by voiceprint recognizable period unit on the given voice signal (microphone signal), checking against voiceprint data stored in the voiceprint register 4, specifies matching speaker data and processes the same.

Accordingly, a microphone signal can be processed as a speaker data with which personal identification is already performed.

The present embodiment is not limited to the content shown in FIG. 5 and may be variously modified.

Figure 7:
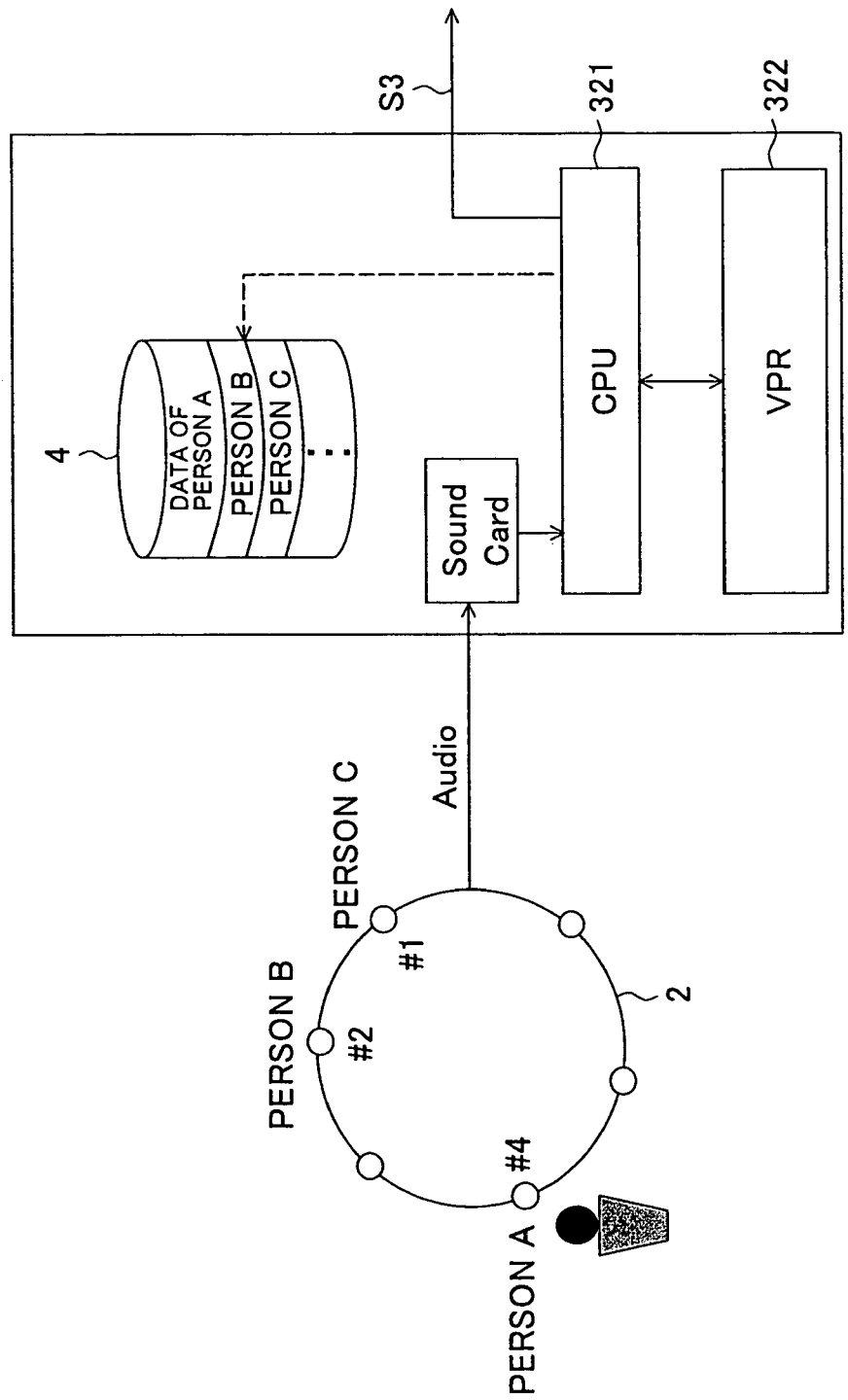
FIG. 7 is a view of a modified example of the voice processing apparatus 1 in the first embodiment.

FIG. 7 is a view of a modified example of the configuration of the voice processing apparatus 1 of the present embodiment shown in FIG. 5.

As shown in FIG. 7, the CPU 321, the voiceprint recognition portion 322 and the voiceprint register 4 may be integrally configured.

Second Embodiment

Below, a second embodiment of the present invention will be explained.

Figure 8:
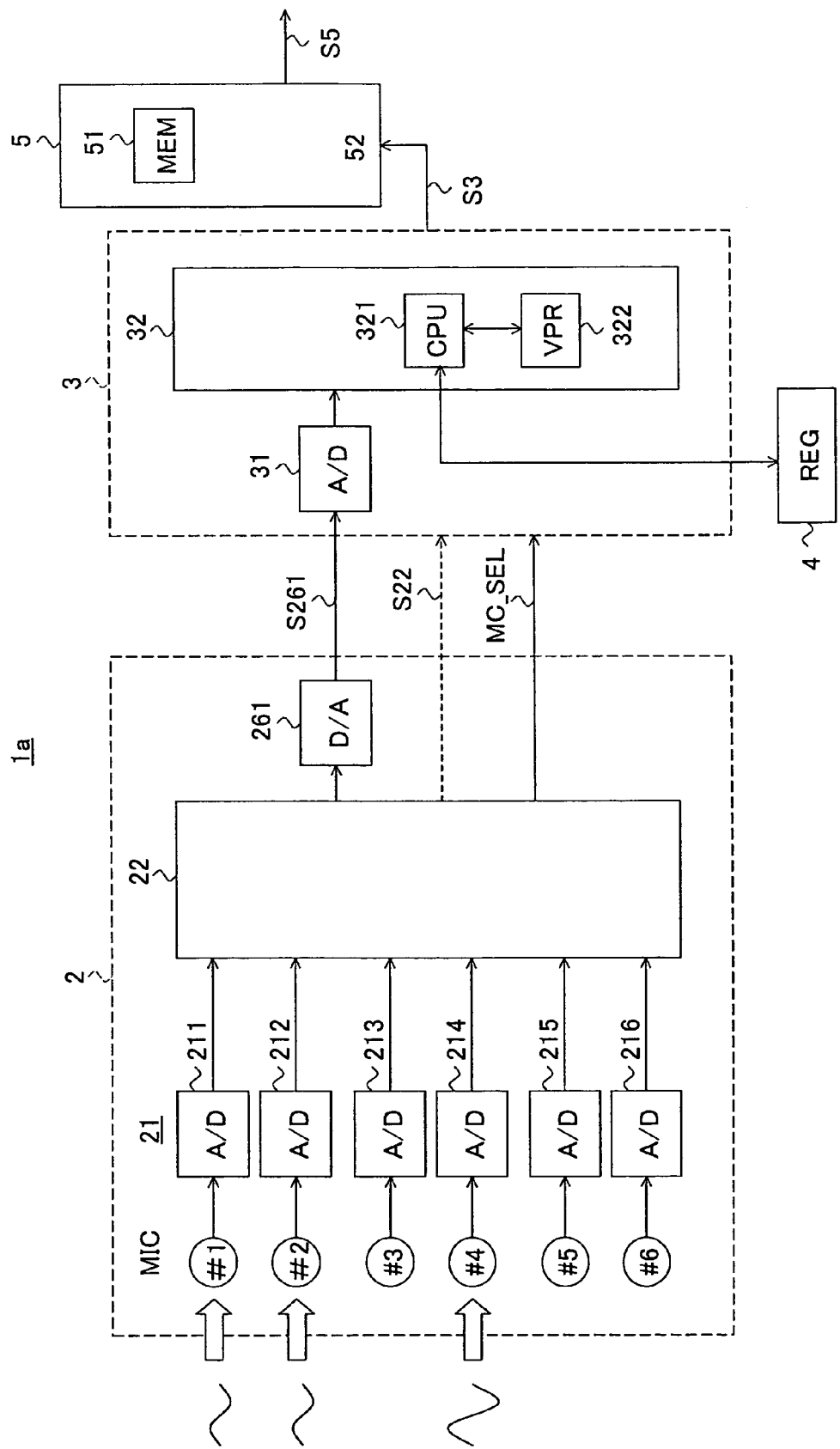
FIG. 8 is a block diagram of a voice processing apparatus 1a of a second embodiment.

FIG. 8 is a block diagram of a voice processing apparatus 1a in the second embodiment.

Comparing with the voice processing apparatus 1 according to the first embodiment, the voice processing apparatus 1a is different in a point that an attribute data processing portion 5 is further provided.

The attribute data processing portion 5 has an attribute data memory 51.

Note that an attribute data memory means in the present invention corresponds to an attribute data memory 51 in the present embodiment.

A data processing means in the present invention corresponds to the attribute data processing portion 5 in the present embodiment.

In the present embodiment, the voice recognition processing portion 3 outputs speaker data S3 specified by a voiceprint recognition result.

The attribute data processing portion 5 receives as an input the speaker data S3, checks against attribute data stored in the attribute data memory 51 and outputs attribute data S5.

The attribute data memory 51 stores respective speaker data and attribute data by associating the both.

The attribute data is personal information, for example, name, group, sex and hobby, etc. of each speaker and can be updated by accessing to the attribute memory 51 from the outside.

Figure 9:
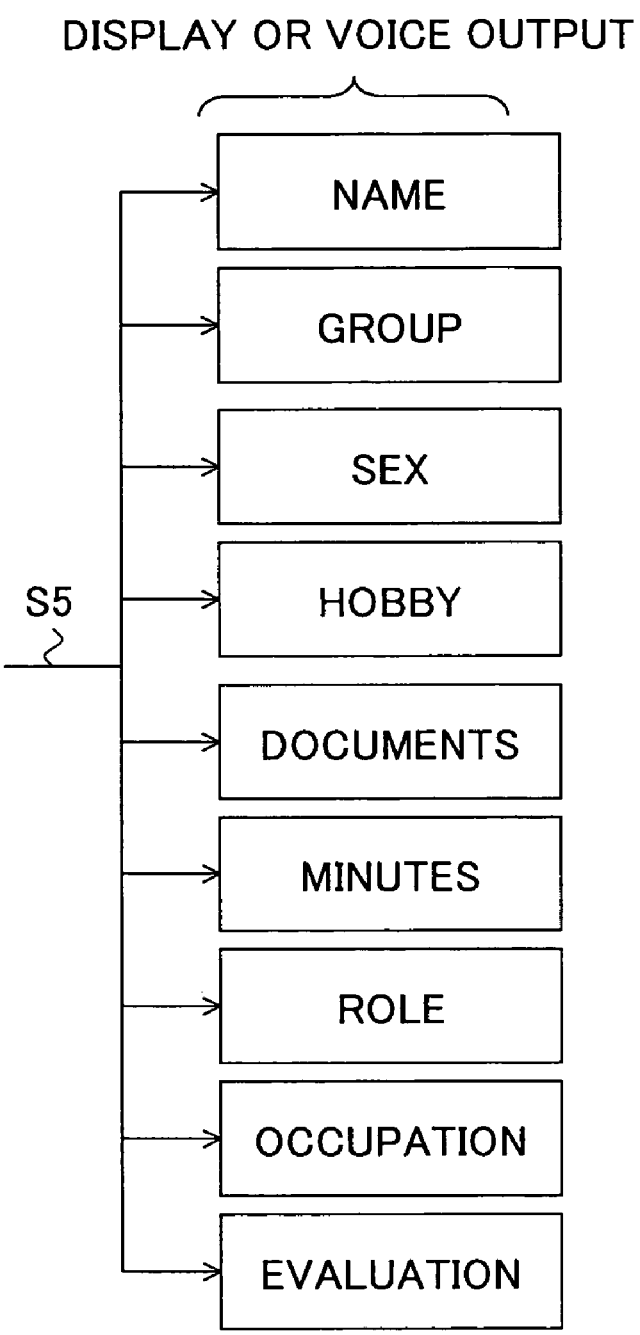
FIG. 9 is a view of an example of attribute data shown by the voice processing apparatus 1a of the second embodiment.

FIG. 9 is a view of an example of processing on attribute data S5.

As shown in FIG. 9, attribute data of a speaker can be output on a screen by using an external display device (not shown). It may be also output by voice.

According to the voice processing apparatus 1a in the present embodiment, even in the case where speeches by a plurality of persons to the voice processing apparatus 1 overlap through microphones respectively facing to a plurality of conference participants, a sound pressure level is analyzed for each band of respective voices by characteristics of the bi-directional telephonic communication portion 2 provided to the voice processing apparatus 1a, so a microphone signal of a main speaker is specified and the voice signal is given to the voice recognition processing portion 3.

Accordingly, in the voice recognition processing portion 3, a possibility of causing erroneous recognition processing can be prevented as much as possible even when a plurality of voices are input at a time, and it is possible to suitably judge a voice of a main speaker and perform processing.

The voice recognition processing portion 3 performs voiceprint recognition processing by voiceprint recognizable period unit on the given voice signal (microphone signal), checks against voiceprint data stored in the voiceprint register 4, and gives matching speaker data to the attribute data processing portion 5.

In the attribute data processing portion 5, the input speaker data is checked against data in the attribute data memory 51 and attribute data thereof is displayed on a not shown external display device, etc., so the conference participants do not have to refer to distributed documents, etc. and are able to concentrate on a speech and the conference can proceed smoothly.

Third Embodiment

Below, a third embodiment of the present invention will be explained.

Figure 10:
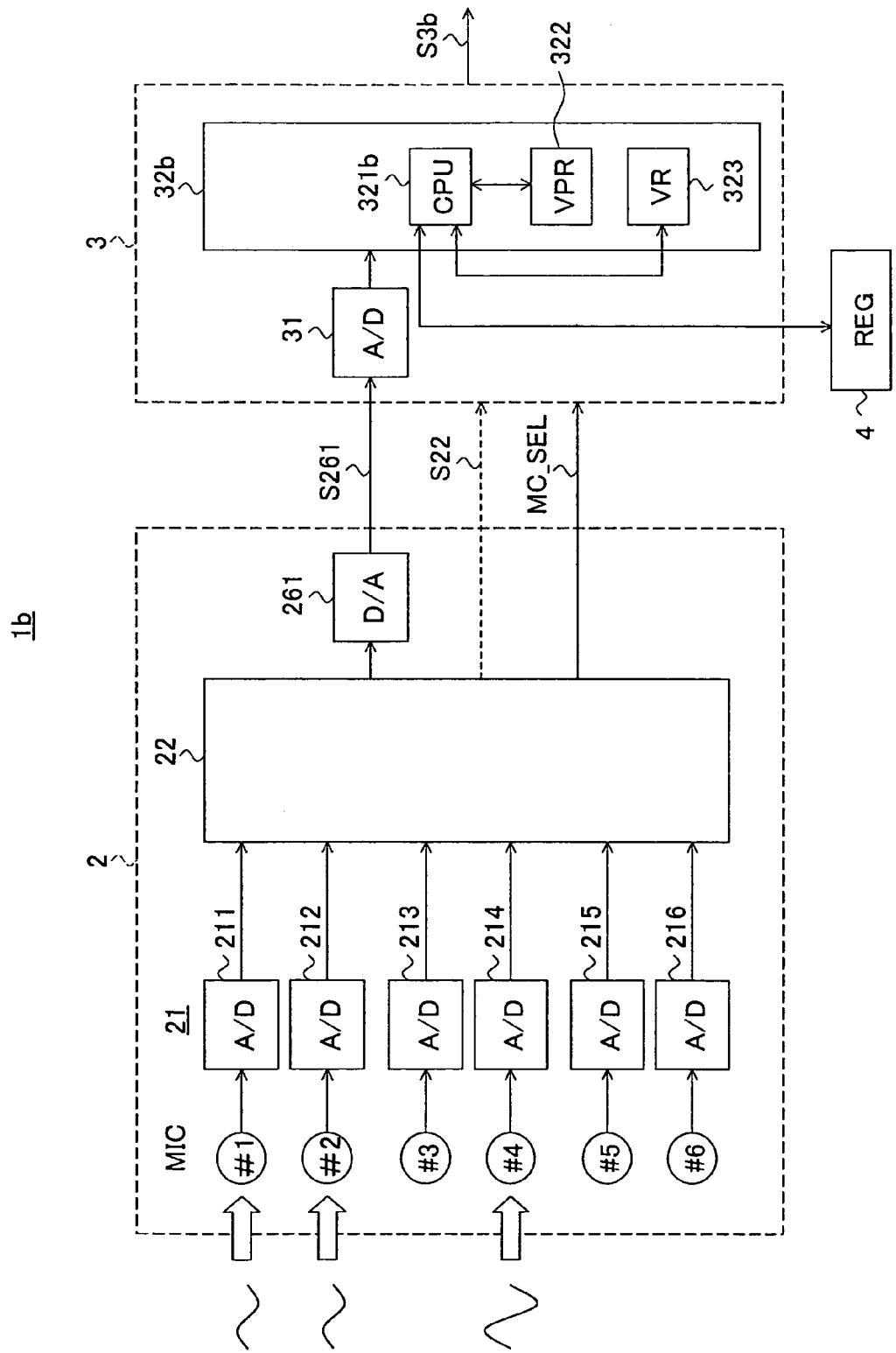
FIG. 10 is a block diagram of a voice processing apparatus 1b of a third embodiment.

FIG. 10 is a block diagram of a voice processing apparatus 1b according to the third embodiment.

Comparing with the voice processing apparatus 1 according to the first embodiment, the voice processing apparatus 1b is different in a point that a voice recognition portion 323 is further provided to a recognition processing portion 32b.

Note that a voice conversion means in the present invention corresponds to the voice recognition portion 323 in the present embodiment.

Voice recognition by the voice recognition portion 323 is performed in parallel with the personal identification processing by voiceprint recognition explained in the first embodiment, or as a serial processing.

The voice recognition portion 323 converts a microphone signal taken through the bi-directional telephonic communication portion 2 and the A/D converter 31 to a character string data (text data) as a result of the voice recognition.

The converted character string data is output as a signal S3b.

The voice processing apparatus 1b according to the present embodiment gives the same effects as those in the first embodiment.

Namely, according to the voice processing apparatus 1b according to the present embodiment, even in the case where speeches by a plurality of persons to the voice processing apparatus 1 overlap through microphones respectively facing to a plurality of conference participants, a sound pressure level is analyzed for each band of respective voices by characteristics of the bi-directional telephonic communication portion 2 provided to the voice processing apparatus 1b, a microphone signal of a main speaker is specified and the voice signal is given to the voice recognition processing portion 3.

Accordingly, in the voice recognition processing portion 3, a possibility of causing erroneous recognition processing can be prevented as much as possible even when a plurality of voices are input at a time, and it is possible to suitably judge a voice of a main speaker and perform processing.

The voice recognition processing portion 3 performs voiceprint recognition processing, by voiceprint recognizable period unit, on the given voice signal (microphone signal), checks against voiceprint data stored in the voiceprint register 4, and specifies matched speaker data.

When the speaker is specified, the voice signal (microphone signal) is subjected to voice recognition processing by the voice recognition portion 323, and the speech data (microphone signal) is stored for each speaker in an external memory.

Accordingly, for example, in the case of creating minutes after a conference, data arrangement becomes easy because respective speech data is stored for each speaker.

The present embodiment is not limited to the content shown in FIG. 10 and may be variously modified.

Figure 11:
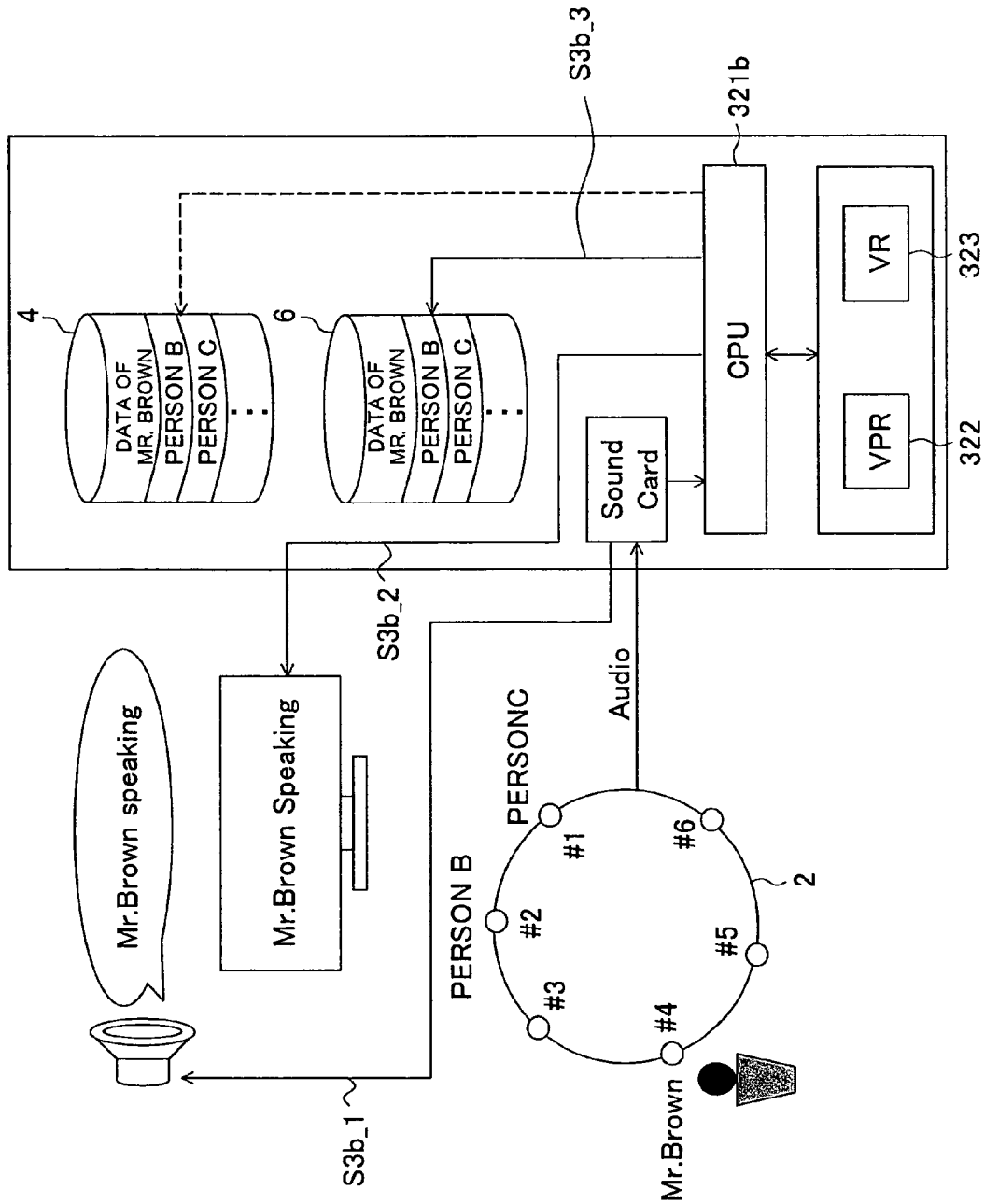
FIG. 11 is a view of a modified example of the voice processing apparatus 1b of the third embodiment.

FIG. 11 is a view of a modified example of the configuration of the voice processing apparatus 1b in the present embodiment shown in FIG. 10.

In the voice processing apparatus 1b shown in FIG. 10, the CPU 321b, the voiceprint recognition portion 322, the voice recognition portion 323 and the voiceprint register 4 are integrally configured, and a speaker data storage portion 6 is further provided as an output destination of each speaker data.

The speaker data storage portion 6 is configured to be able to store speaker data for each of a plurality of speakers as shown in FIG. 11.

According to the voice processing apparatus 1b shown in FIG. 11, the speech data of a specified speaker can be output by voice (S3b_1) via a sound card, output as a video (S3b_2) to an external display device, and stored as speech record in the above speaker data storage portion 6 in accordance with a use of the voice processing apparatus.

The embodiments explained above are for easier understanding of the present invention and not to limit the present invention. Accordingly, respective elements disclosed in the above embodiments includes all modifications in designs and equivalents belonging to the technical field of the present invention.

What is claimed is:

1. A voice identification processing apparatus, comprising:
a plurality of microphones arranged to direct to respectively different sound collecting directions;
a microphone selection means for selecting one microphone in accordance with sound pressures of sounds collected by said plurality of microphones;

a voiceprint recognition means for processing a voice signal into voiceprint recognizable periods, for successively performing voiceprint recognition in each voiceprint recognizable period based on the voice signal collected by said one microphone and for generating voiceprint data for each voiceprint recognizable period, wherein when a length of the processed voice signal is less than the voiceprint recognizable period, no voiceprint data is generated; and a data processing means for processing the voice signal collected by said one microphone to identify a speaker in accordance with the voiceprint data generated by said voiceprint recognition means and when the length of the processed voice signal is less than the voiceprint recognizable period, identifying the speaker based on a last voiceprint recognizable period.

2. A voice processing apparatus as set forth in claim 1, further comprising a voiceprint data memory means for storing speaker data and voiceprint data associated therewith, wherein said data processing means processes the voiceprint data generated by the voiceprint recognition means by associating with speaker data obtained by checking against voiceprint data stored in said voiceprint data memory means.

3. A voice processing apparatus as set forth in claim 2, wherein:

speaker data stored in said voiceprint data memory means is made to correspond to each of said plurality of microphones; and said data processing means processes the voice signal collected by said one microphone based on a result of comparing first speaker data obtained by checking against voiceprint data stored in the voiceprint data memory means with second speaker data corresponding to said one microphone.

4. A voice processing apparatus as set forth in claim 3, wherein said data processing means compares said first speaker data with said second speaker data and, only when the two are matched, processes the voice signal output from said one microphone by associating with said second speaker data.

5. A voice processing apparatus as set forth in claim 3, wherein said data processing means compares said first speaker data with said second speaker data and, only when the two are not matched, processes the voice signal output from said one microphone by associating with said first speaker data.

6. A voice processing apparatus as set forth in claim 2, further comprising a voice conversion means for converting a voice signal to character string data, wherein said voice conversion means converts the voice signal collected by said one microphone to character string data; and said data processing means processes said character string data by associating with the speaker data obtained by checking against said voice signal.

7. A voice processing apparatus as set forth in claim 3, further comprising a voice conversion means for converting a voice signal to character string data, wherein said voice conversion means converts the voice signal collected by said one microphone to character string data; and said data processing means processes said character string data by associating with the speaker data obtained by checking against said voice signal.

8. A voice processing apparatus as set forth in claim 4, further comprising a voice conversion means for converting a voice signal to character string data, wherein said voice conversion means converts the voice signal collected by said one microphone to character string data; and said data processing means processes said character string data by associating with the speaker data obtained by checking against said voice signal.

9. A voice processing apparatus as set forth in claim 5, further comprising a voice conversion means for converting a voice signal to character string data, wherein said voice conversion means converts the voice signal collected by said one microphone to character string data; and said data processing means processes said character string data by associating with the speaker data obtained by checking against said voice signal.

10. A voice identification processing apparatus, comprising:

a plurality of microphones arranged to direct to respectively different sound collecting directions;

a microphone selection means for selecting one microphone in accordance with sound pressures of sounds collected by said plurality of microphones;

a voiceprint recognition means for processing a voice signal into voiceprint recognizable periods, for successively performing voiceprint recognition in each voiceprint recognizable period based on the voice signal collected by said one microphone and for generating voiceprint data for each voiceprint recognizable period, wherein when a length of the processed voice signal is less than the voiceprint recognizable period, no voiceprint data is generated;

a voiceprint data memory means for storing speaker data and voiceprint data associated therewith;

an attribute data memory means for storing speaker data and attribute data associated therewith; and a data processing means for specifying speaker data by matching the voiceprint data generated by the voiceprint recognition means with voiceprint data stored in said voiceprint data memory means, for processing the same by associating said speaker data with corresponding attribute data and when the length of the processed voice signal is less than the voiceprint recognizable period, identifying the speaker based on a last voiceprint recognizable period.

11. A voice processing apparatus as set forth in claim 10, wherein:

speaker data stored in said voiceprint data memory means is made to correspond to each of said plurality of microphones; and said data processing means processes attribute data corresponding to said first speaker data based on a result of comparing first speaker data obtained by checking against voiceprint data stored in the voiceprint data memory means with second speaker data corresponding to said one microphone.

12. A voice processing apparatus as set forth in claim 11, wherein said data processing means compares said first speaker data with said second speaker data and, only when the two are matched, processes attribute data corresponding to said second speaker data.

13. A voice processing apparatus as set forth in claim 11, wherein said data processing means compares said first speaker data with said second speaker data and, only when the two are not matched, processes attribute data corresponding to said first speaker data.

14. A voice identification processing apparatus, comprising:

a plurality of microphones arranged to direct to respectively different sound collecting directions;

a microphone selection means for selecting one microphone in accordance with sound pressures of sounds collected by said plurality of microphones;

voiceprint recognition means for processing a voice signal into voiceprint recognizable periods, for successively performing voiceprint recognition in each voiceprint recognizable period based on the voice signal collected by said one microphone and for generating voiceprint data for each voiceprint recognizable period, wherein when a length of the processed voice signal is less than the voiceprint recognizable period, no voiceprint data is generated;

a data processing means for specifying a speaker based upon the voice signal from said one microphone and the voiceprint data generated by the voiceprint recognition means and when the length of the processed voice signal is less than the voiceprint recognizable period, identifying the speaker based on a last voiceprint recognizable period; and a voice conversion means for converting the voice signal collected by said one microphone to character string data based upon the speaker specified by the data processing means.

15. A voice identification processing apparatus, comprising:

a plurality of unidirectional microphones arranged toward respectively different sound collecting directions;

a microphone selection means for selecting one of said unidirectional microphones in accordance with signal levels of sounds collected by said plurality of unidirectional microphones;

a voiceprint recognition means for processing a voice signal into voiceprint recognizable periods, for successively performing voiceprint recognition in each voiceprint recognizable period based on the voice signal output by said selected one microphone and for generating voiceprint data, wherein when a length of the processed voice signal is less than the voiceprint recognizable period, no voiceprint data is generated; and a data processing means for comparing the voice signal output by said selected one microphone with the voiceprint data generated by said voiceprint recognition means, for specifying a speaker associated with the selected one microphone and when the length of the processed voice signal is less than the voiceprint recognizable period, identifying the speaker based on a last voiceprint recognizable period.

16. A voice processing apparatus as set forth in claim 15, further comprising a voiceprint data memory means for storing speaker data and voiceprint data associated therewith, wherein said data processing means processes the voiceprint data generated by the voiceprint recognition means by associating with the speaker data obtained by comparing voiceprint data stored in said voiceprint data memory means.

17. A voice processing apparatus as set forth in claim 16, wherein:

speaker data stored in said voiceprint data memory means corresponds to each of said plurality of unidirectional microphones; and said data processing means processes the voice signal collected by said selected one microphone based on comparing first speaker data obtained by comparing voiceprint data stored in the voiceprint data memory means with second speaker data corresponding to said selected one microphone.

18. A voice processing apparatus as set forth in claim 17, wherein said data processing means compares said first speaker data with said second speaker data and, only when the first and second speaker data match, processes the voice signal output from said selected one microphone by associating said second speaker data therewith.

19. A voice processing apparatus as set forth in claim 17, wherein said data processing means compares said first speaker data with said second speaker data and, only when the first and second speaker data do not match, processes the voice signal output from said selected one microphone by associating said first speaker data therewith.

20. A voice processing apparatus as set forth in claim 16, further comprising a voice conversion means for converting a voice signal to character string data, wherein said voice conversion means converts the voice signal collected by said selected one microphone into character string data; and said data processing means processes said character string data by associating the speaker data therewith, the speaker data being obtained by comparison with said voice signal.

21. A voice processing apparatus as set forth in claim 17, further comprising a voice conversion means for converting a voice signal to character string data,
wherein said voice conversion means converts the voice signal collected by said selected one microphone into character string data; and said data processing means processes said character string data by associating the speaker data therewith, the speaker data being obtained by comparison with said voice signal.

22. A voice processing apparatus as set forth in claim 17, further comprising a voice conversion means for converting a voice signal to character string data, wherein said voice conversion means converts the voice signal collected by said selected one microphone into character string data; and said data processing means processes said character string data by associating the speaker data therewith, the speaker data being obtained by comparison with said voice signal.

23. A voice processing apparatus as set forth in claim 19, further comprising a voice conversion means for converting a voice signal to character string data,
wherein said voice conversion means converts the voice signal collected by said selected one microphone into character string data; and said data processing means processes said character string data by associating the speaker data therewith, the speaker data being obtained by comparison with said voice signal.

24. A voice identification processing apparatus, comprising:

a plurality of unidirectional microphones arranged toward respectively different sound collecting directions;

a microphone selection means for selecting one of the unidirectional microphones in accordance with signal levels of sounds collected by said plurality of unidirectional microphones;

a voiceprint recognition means for processing a voice signal into voiceprint recognizable periods, for successively performing voiceprint recognition in each voiceprint recognizable period based on the voice signal output by said selected one microphone and for generating voiceprint data, wherein when a length of the processed voice signal is less than the voiceprint recognizable period, no voiceprint data is generated;

a voiceprint data memory means for storing speaker data and voiceprint data associated therewith;

an attribute data memory means for storing speaker data and attribute data associated therewith; and a data processing means for specifying speaker data associated with the selected one microphone by matching the voiceprint data generated by the voiceprint recognition means with voiceprint data stored in said voiceprint data memory means, for associating said specified speaker data with corresponding attribute data stored in said attribute data memory means and when the length of the processed voice signal is less than the voiceprint recognizable period, identifying the speaker based on a last voiceprint recognizable period.

25. A voice processing apparatus as set forth in claim 24, wherein:

speaker data stored in said voiceprint data memory means is made to corresponds to each of said plurality of unidirectional microphones; and said data processing means processes attribute data corresponding to said first speaker data based on comparing first speaker data obtained by comparing voiceprint data stored in the voiceprint data memory means with second speaker data corresponding to said selected one microphone.

26. A voice processing apparatus as set forth in claim 25, wherein said data processing means compares said first speaker data with said second speaker data and, only when the first and second speaker data match, processes attribute data corresponding to said second speaker data.

27. A voice processing apparatus as set forth in claim 25, wherein said data processing means compares said first speaker data with said second speaker data and, only when the first and second speaker data do not match, processes attribute data corresponding to said first speaker data.

28. A voice identification processing apparatus, comprising:

a plurality of unidirectional microphones arranged toward respectively different sound collecting directions;

a microphone selection means for selecting one of said unidirectional microphones, in accordance with signal levels of sounds collected by said plurality of microphones, as a main speaker;

voiceprint recognition means for processing a voice signal into voiceprint recognizable periods, for successively performing voiceprint recognition in each voiceprint recognizable period based on the voice signal of the selected one microphone and for generating voiceprint data, wherein when a length of the processed voice signal is less than the voiceprint recognizable period, no voiceprint data is generated;

a data processing means for identifying the main speaker based upon the voice signal from the selected one microphone and the voiceprint data generated and when the length of the processed voice signal is less than the voiceprint recognizable period, identifying the speaker based on a last voiceprint recognizable period; and a voice conversion means for converting the voice signal from said selected one microphone to character string data and for associating the character string data with the main speaker identified by the data processing means.

* * * * *